United States Patent
Sanada

(10) Patent No.: US 9,571,771 B2
(45) Date of Patent: Feb. 14, 2017

(54) DATA TRANSFER CIRCUIT, IMAGING DEVICE AND IMAGING APPARATUS

(71) Applicant: Sony Corporation, Tokyo (JP)

(72) Inventor: Shingo Sanada, Fukuoka (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 14/025,220

(22) Filed: Sep. 12, 2013

(65) Prior Publication Data
US 2014/0104470 A1 Apr. 17, 2014

(30) Foreign Application Priority Data

Oct. 12, 2012 (JP) ................................. 2012-226605

(51) Int. Cl.
*H03M 1/12* (2006.01)
*H04N 3/14* (2006.01)
*H04N 5/378* (2011.01)

(52) U.S. Cl.
CPC ..................... *H04N 5/378* (2013.01)

(58) Field of Classification Search
CPC ..................... H03M 1/00–1/645; H04N 5/369; H04N 5/378

USPC ........................ 348/294–308; 341/126, 155
See application file for complete search history.

(56) References Cited

U.S. PATENT DOCUMENTS

| 8,319,522 | B2* | 11/2012 | Takahashi ........................ 326/82 |
| 2008/0303931 | A1* | 12/2008 | Taguchi et al. ............... 348/308 |
| 2012/0154649 | A1* | 6/2012 | Itzhak et al. .................. 348/294 |
| 2012/0229666 | A1* | 9/2012 | Hagihara ................... 348/222.1 |

FOREIGN PATENT DOCUMENTS

JP    2008-306695 A    12/2008

* cited by examiner

*Primary Examiner* — Sinh Tran
*Assistant Examiner* — Selam T Gebriel
(74) *Attorney, Agent, or Firm* — Chip Law Group

(57) ABSTRACT

A data transfer circuit includes a plurality of data transfer sections which transfer pixel signals of pixel columns which are different from each other, wherein the plurality of data transfer sections include transfer lines which transfer the pixel signals read from the pixel columns of an image sensor; and amplifying sections which amplify the pixel signals output from the transfer lines, and wherein the plurality of data transfer sections are connected to each other in series.

10 Claims, 16 Drawing Sheets

DATA TRANSFER CIRCUIT, IMAGING DEVICE AND IMAGING APPARATUS

CROSS REFERENCE TO RELATED APPLICATIONS

This application claims the benefit of priority under 35 U.S.C. §119 from Japanese Priority Patent Application JP 2012-226605 filed Oct. 12, 2012, the entire contents of which are incorporated herein by reference.

BACKGROUND

The present technology relates to a data transfer circuit, an imaging device and an imaging apparatus, and, particularly, to a data transfer circuit, an imaging device and an imaging apparatus which can suppress an increase in transfer delay.

In the related art, there is an imaging device which performs A/D conversion in pixel signals that are read from pixel array for each line, respectively and transfers the pixel signals to a data output section. In such an imaging device, there is a concern that a difference between a delay time of the pixel signals which are read from a pixel column of a far side from an output side and a delay time of the pixel signals which are read from a pixel column of a near side from the output side is large, a setup time margin and a hold time margin of a flip-flop measuring synchronization with a global clock are reduced and a transfer speed is decreased in a data transfer circuit which transfers the pixel signals.

Then, a data transfer circuit is considered which performs data capture in a digital data output section with high accuracy at a high speed by reducing delay generated in a transfer line through which the data is transferred to the digital data output section by adjusting the delay of a clock line for the data capture of the digital data output section (see, for example, Japanese Unexamined Patent Application Publication No. 2008-306695).

SUMMARY

However, in the method, when the pixel columns are in large numbers and the transfer lines are long, there is a concern that contribution for reducing the delay caused in a transfer bus is limited and an increase in wiring delay is caused.

The present technology is proposed in view of such a situation and it is desirable to suppress an increase in a transfer delay.

According to a first embodiment of the present technology, there is provided a data transfer circuit including: a plurality of data transfer sections which transfer pixel signals of pixel columns which are different from each other. The plurality of data transfer sections include transfer lines which transfer the pixel signals read from the pixel columns of an image sensor; and amplifying sections which amplify the pixel signals output from the transfer lines. The plurality of data transfer sections are connected to each other in series.

The data transfer section may include, for each pixel column, a counter latch which holds the pixel signal by converting a signal level of the pixel signal read from the pixel into a digital value and the transfer line may sequentially transfer the digital value which is held in each counter latch.

The data transfer circuit may further include a column scanning circuit which controls a transfer timing of the pixel signal of each pixel column for each data transfer section, and each column scanning circuit may have clock lines which are independent from each other to obtain clock signals.

The data transfer circuit may further include a relay data transfer section which holds the pixel signal output from the data transfer section and supplies the pixel signal which is held to the data transfer section of the next stage, and the plurality of data transfer sections may be connected to each other in series via the relay data transfer section.

The relay data transfer section may include a holding section which holds the pixel signal, and a reading section which reads the pixel signal held in the holding section.

The reading section may read the pixel signal held in the holding section when being synchronized between the plurality of data transfer sections.

The data transfer section supplying the pixel signal to the relay data transfer section may supply the pixel signal of each pixel column to the relay data transfer section earlier than a timing of the pixel signal corresponding to the output timing from the data transfer circuit.

The relay data transfer section may include a plurality of holding sections and the data transfer section supplying the pixel signal to the relay data transfer section may supply the pixel signal of each pixel column to the relay data transfer section earlier than a timing of the pixel signal corresponding to the output timing from the data transfer circuit by an amount of time corresponding to the number of the holding sections of the relay data transfer section.

The data transfer circuit may further include: a synchronizing section which synchronizes with an output timing of the pixel signal output from the data transfer section closest to output side.

According to a second embodiment of the present technology, there is provided an imaging device including: a pixel area which has a plurality of pixels having light receiving sections which photoelectrically convert incident light; and a plurality of data transfer sections which transfer pixel signals of the pixel columns which are different from each other. The plurality of data transfer sections include transfer lines which transfer the pixel signals read from pixel columns of the pixel area; and amplifying sections which amplify the pixel signals output from the transfer lines. The plurality of data transfer sections are connected to each other in series.

According to a third embodiment of the present technology, there is provided an imaging apparatus including: an imaging device; and an image processing section which processes a target image which is photoelectrically converted in the imaging device. The imaging device includes a pixel area which has a plurality of pixels having a light receiving section which photoelectrically converts incident light; and a plurality of data transfer sections which transfer pixel signals of the pixel columns which are different from each other. The plurality of data transfer sections include transfer lines which transfer the pixel signals read from pixel columns of the pixel area; and amplifying sections which amplify the pixel signals output from the transfer lines. The plurality of data transfer sections are connected to each other in series.

According to the first embodiment of the present technology, the data transfer circuit includes a plurality of data transfer sections which transfer pixel signals of pixel columns which are different from each other. The plurality of data transfer sections include transfer lines which transfer the pixel signals read from the pixel columns of an image sensor; and amplifying sections which amplify the pixel signals output from the transfer lines. The plurality of data transfer sections are connected to each other in series.

According to the second embodiment of the present technology, the imaging device includes a pixel area which has a plurality of pixels having light receiving sections which photoelectrically convert incident light; and a plurality of data transfer sections which transfer pixel signals of the pixel columns which are different from each other. The plurality of data transfer sections include transfer lines which transfer the pixel signals read from pixel columns of the pixel area; and amplifying sections which amplify the pixel signals output from the transfer lines. The plurality of data transfer sections are connected to each other in series.

According to the third embodiment of the present technology, the imaging apparatus includes an imaging device; and an image processing section which processes a target image which is photoelectrically converted in the imaging device. The imaging device includes a pixel area which has a plurality of pixels having a light receiving section which photoelectrically converts incident light; and a plurality of data transfer sections which transfer pixel signals of the pixel columns which are different from each other. The plurality of data transfer sections include transfer lines which transfer the pixel signals read from pixel columns of the pixel area; and amplifying sections which amplify the pixel signals output from the transfer lines. The plurality of data transfer sections are connected to each other in series.

According to the present technology, the increase in the transfer delay can be suppressed.

DETAILED DESCRIPTION OF EMBODIMENTS

Hereinafter, embodiments (hereinafter, referred to as the embodiments) of the present technology are described. In addition, the description thereof is given in the following order.

1. First Embodiment (Image Sensor)
2. Second Embodiment (Imaging Apparatus)

1. First Embodiment

Image Sensor

Figure 1:
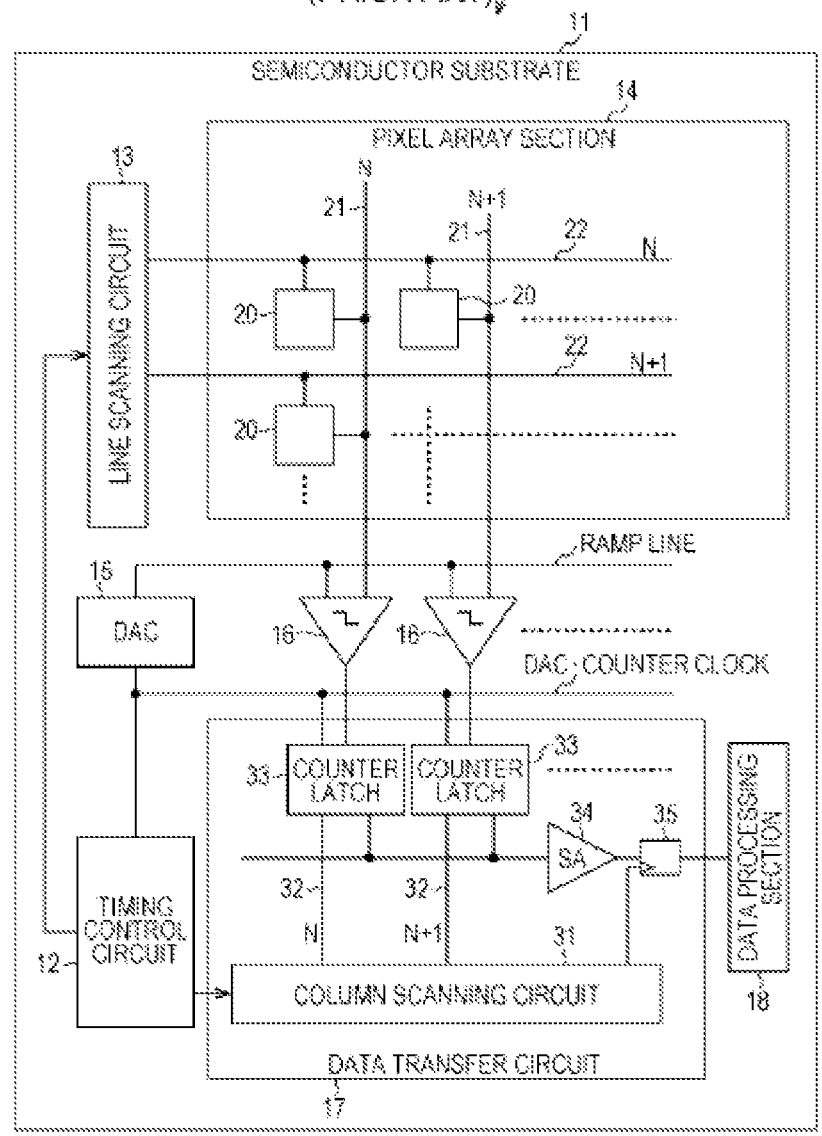
FIG. 1 is a view illustrating a main configuration example of an image sensor of the related art.

FIG. 1 is a block diagram illustrating a configuration example of a portion of the image sensor of the related art. An image sensor 10 illustrated in FIG. 1 is an embodiment of an imaging device, photographs an object and obtains digital data of a captured image.

The image sensor 10 may be any image sensor. For example, a Complementary Metal Oxide Semiconductor (CMOS) image sensor using CMOS, a Charged Coupled Device (CCD) image sensor using CCD or the like may be used.

As illustrated in FIG. 1, the image sensor 10 is formed on a semiconductor substrate 11. The image sensor 10 has a timing control circuit 12, a line scanning circuit 13, a pixel array section 14, a Digital Analog Converter (DAC) 15, a comparator 16, a data transfer circuit 17, a data processing section 18, and the like.

A plurality of pixel sections 20 are formed in the pixel array section 14. In addition, a vertical signal line 21 connecting pixels arranged in the vertical direction in FIG. 1 and a column selection line connecting pixels arranged in the horizontal direction in FIG. 1 are formed in the pixel array section 14. The comparator 16 is provided for each pixel column (the vertical signal line 21). The comparator 16 compares a pixel signal read from the pixels of the corresponding pixel column with a reference signal supplied from the DAC 15 and supplies the comparison result to the data transfer circuit 17.

The data transfer circuit 17 has a column scanning circuit 31, a column selection line 32, a counter latch 33, a sense amplifier 34, and a flip-flop 35. The counter latch 33 is provided for each pixel column, temporarily holds the signal read from the pixels of the pixel column and sequentially supplies the signal to the sense amplifier 34 via a transfer line.

The line scanning circuit 13 controls the read of the pixel signal.

The counter latch 33 and the comparator 16 are provided for each pixel column and output a signal level of the pixel signal which is supplied as a digital value. In other words, the DAC 15, the counter latch 33 and the comparator 16 can be said to configure a column-parallel A/D.

The column scanning circuit 31 reads the digital value of the pixel signal which is held in each counter latch 33 and sequentially outputs the signal to the outside of the image sensor 10 via the sense amplifier 34.

Figure 2:
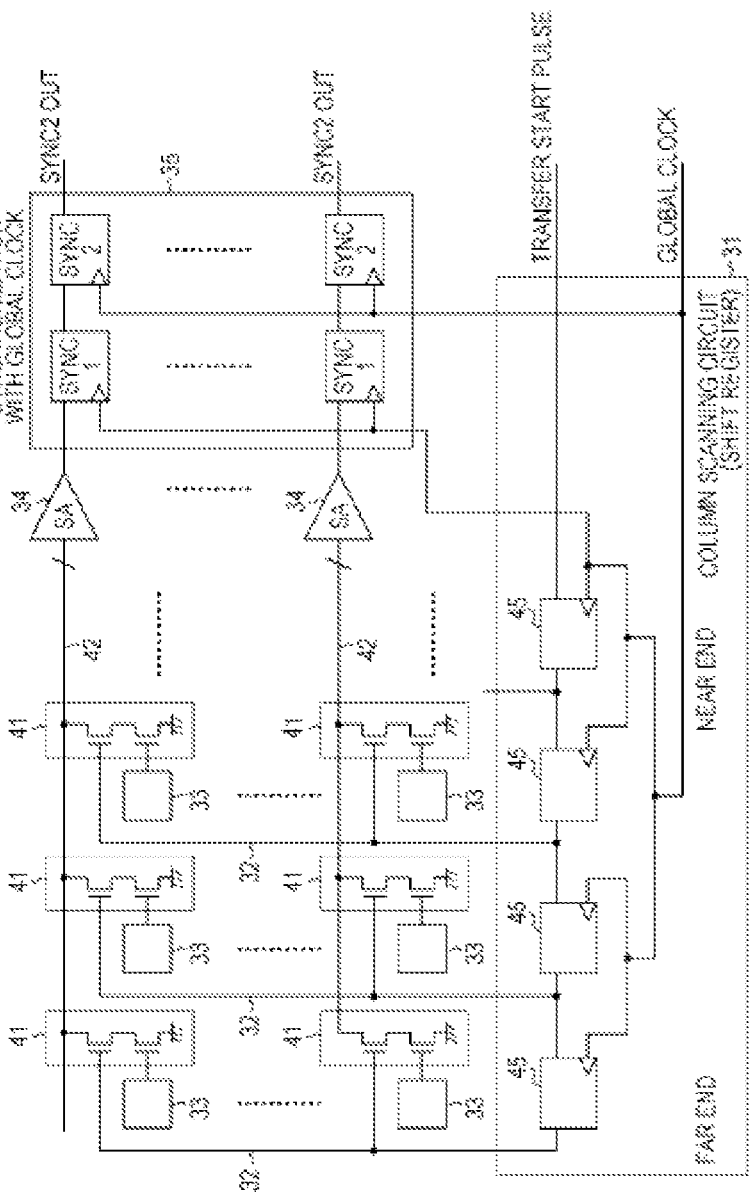
FIG. 2 is a view illustrating a main configuration example of a data transfer circuit of the related art.

FIG. 2 is a view illustrating a more detailed configuration example of the data transfer circuit 17 of FIG. 1. A drive transistor is controlled by the column scanning circuit 31 configured of a shift register 45, sequential access to the counter latch (N-bit) 33 is performed, amplification is performed in the sense amplifier 34, synchronization with global clock is performed and then the data is output to the outside.

Figure 3:
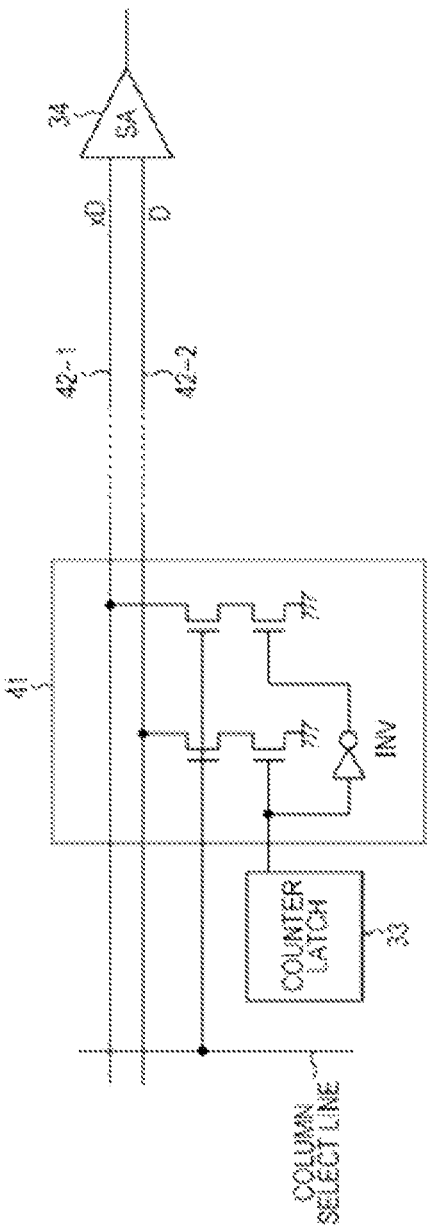
FIG. 3 is a view illustrating a main configuration example of a driver of a data transfer circuit of the related art.

FIG. 3 illustrates a clock configuration of a driver for the data transfer circuit of the related art. As illustrated in FIG. 3, the data transfer is performed in the sense amplifier 34 by amplifying a small voltage difference of a transfer bus.

Figure 4:
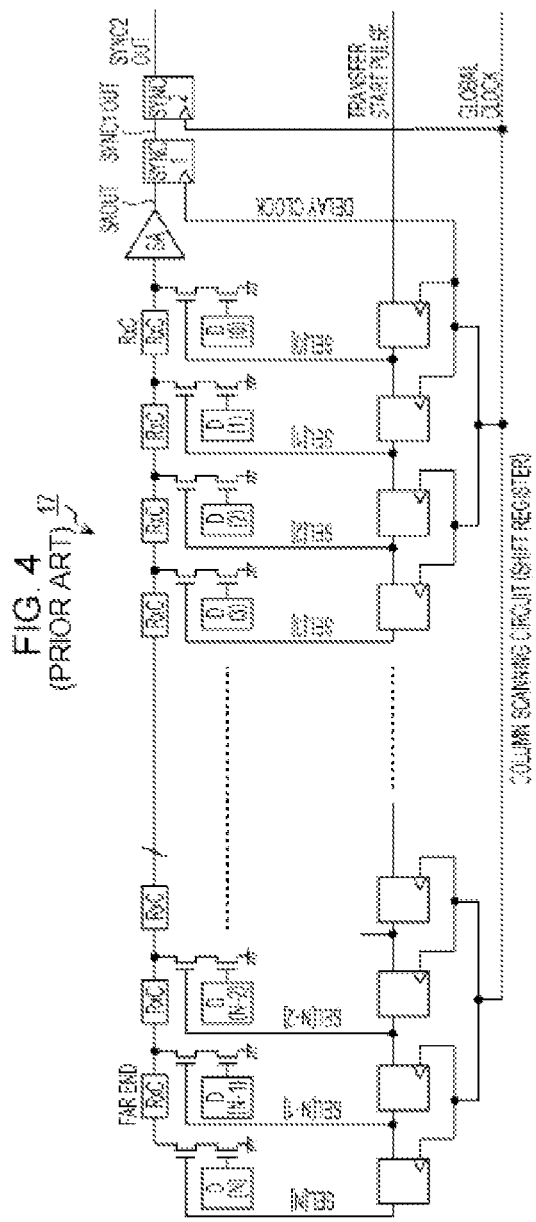
FIG. 4 is a view illustrating a main configuration example of a data transfer circuit of the related art.

FIG. 4 is a view illustrating an entire configuration example of the data transfer circuit 17 of the related art. The data transfer circuit 17 is configured of the counter latch, the drive transistor, the sense amplifier and the column scanning circuit (shift register). Sequential access to the counter latch 33 is performed in a period of a delay clock which is distributed into the shift register 45 configuring the column scanning circuit 31 in branches and leaves form. The sense amplifier 34 outputs a result corresponding to the value of the counter latch 33. The transferred data is synchronized with the global clock by the flip-flop 35.

Figure 5:
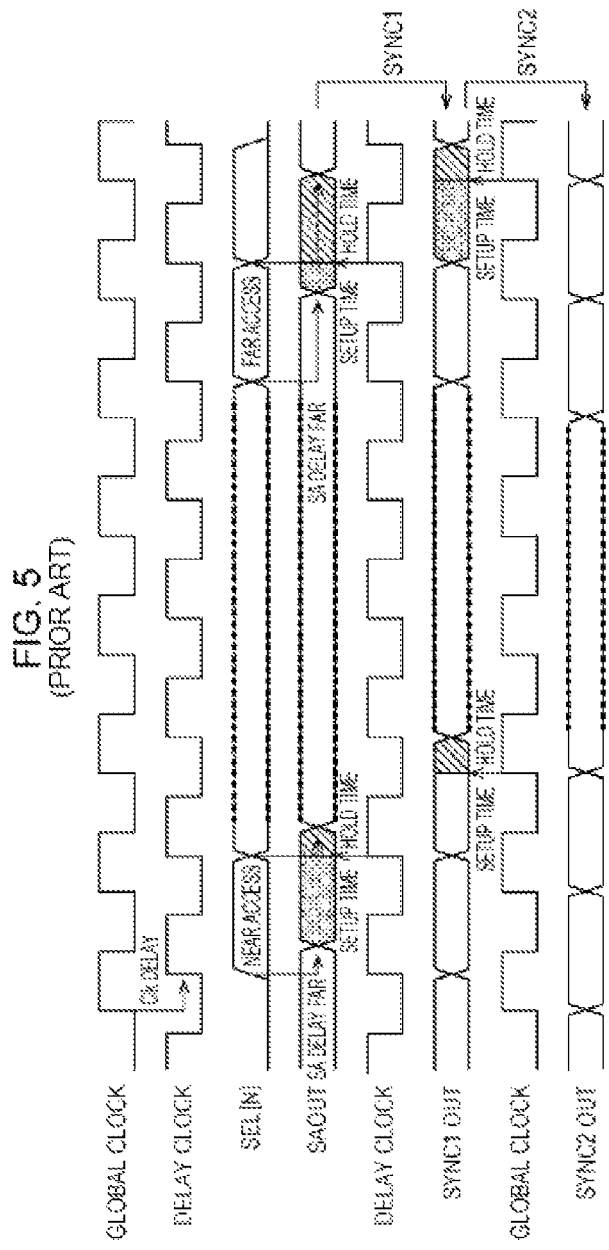
FIG. 5 is a view representing a relationship between setup hold margins of a data transfer circuit of the related art.

FIG. 5 is a view representing a relationship between setup hold margins in the data transfer circuit 17 of the related art. Since the clock which is input into the shift register 45 configuring the column scanning circuit 31 is distributed in the branches and leaves form, a delay time for the global clock equals in all shift registers. Since output delays of the sense amplifiers 34 are different from each other depending on a connected load between column selection drivers from the sense amplifier 34, the output delay is large at a far end of the sense amplifier 34 and the output delay is small at a near end of the sense amplifier 34.

Figure 6:
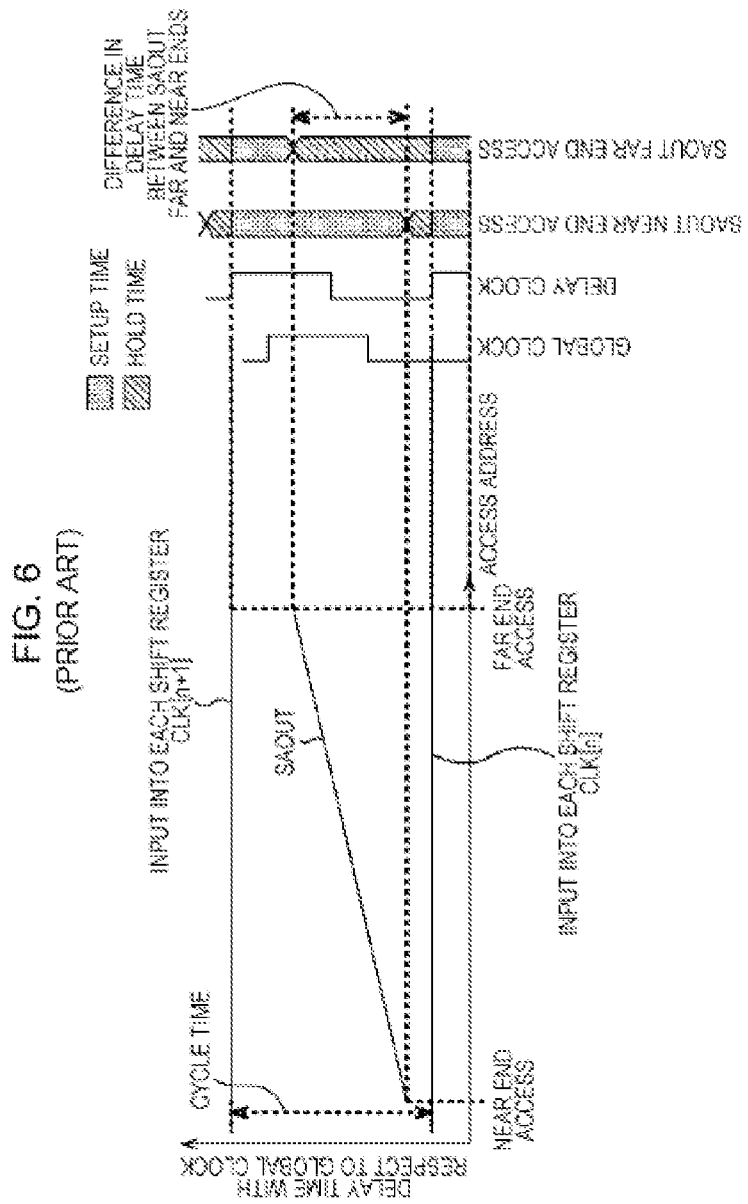
FIG. 6 is a view representing an output delay amount of a data transfer circuit of the related art.

FIG. 6 is a view representing the output of the sense amplifier 34 with respect to the global clock and the output delay amount of the clock which is distributed in the branches and leaves form in the data transfer circuit 17 of the related art. As described above, since difference in the output delay time of the sense amplifier at the far and near ends is large, there is a concern that a setup time margin and a hold time margin of the flip-flop measuring the synchronization with the global clock may be reduced and a transfer speed may be decreased.

Japanese Unexamined Patent Application Publication No. 2008-306695 discloses a method for performing data capture in a digital data output section with high accuracy at a high speed by reducing the delay generated in the transfer line which transfers the data to the digital data output section by adjusting the delay of the clock line for the data capture of the digital data output section. However, in a case where the number of handling column-parallel A/D is in large numbers and the transfer line is long, since the contribution to the reduction of the delay which is generated in the transfer bus is limited in the data transfer circuit, there is a concern that the wiring delay may be increased.

Then, in such a data transfer circuit, a data transfer path is multi-staged and increase in the delay time is suppressed.

Figure 7:
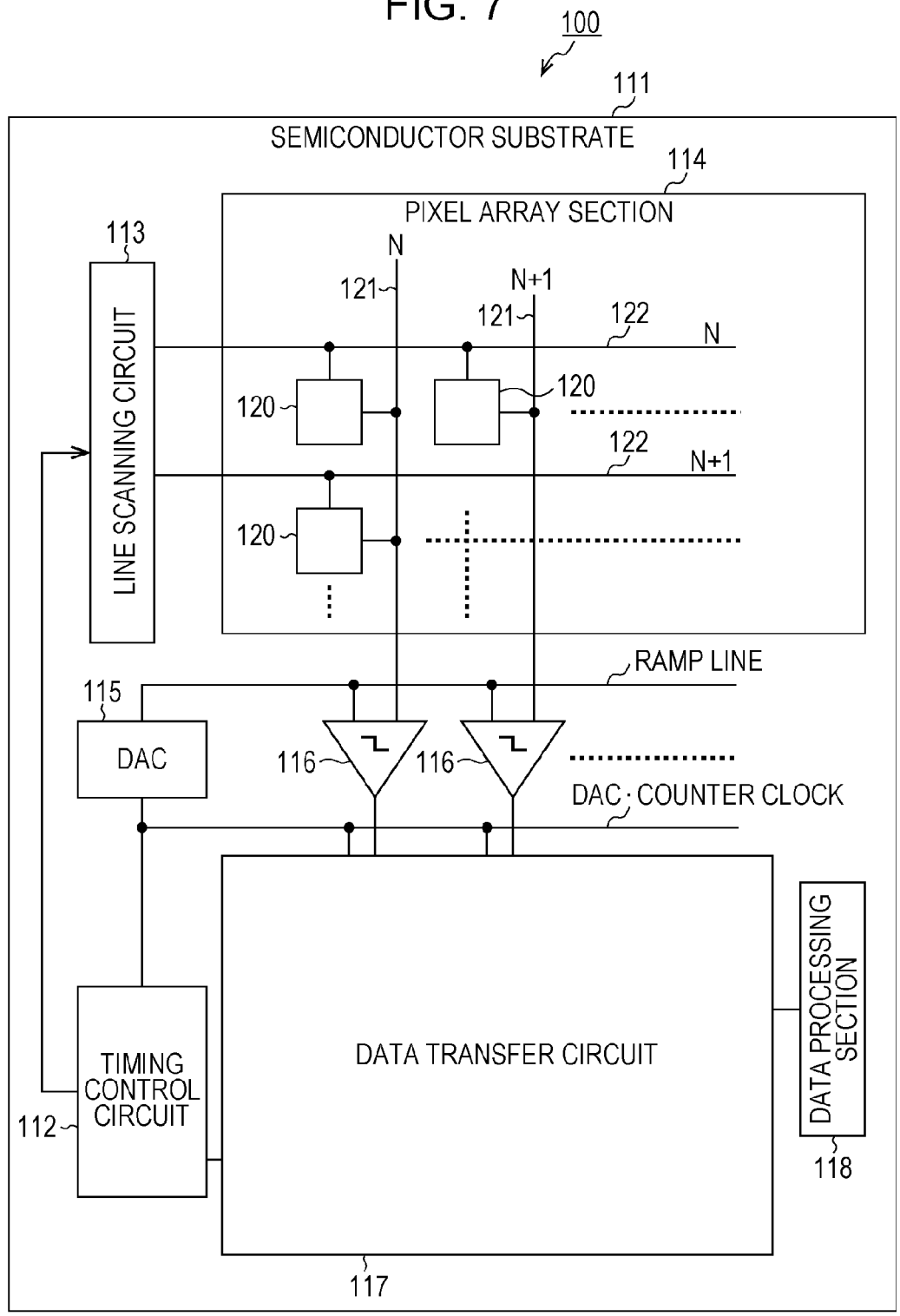
FIG. 7 is a view illustrating a main configuration example of an image sensor.

FIG. 7 is a block diagram illustrating a main configuration example of the image sensor to which the present technology is applied. An image sensor 100 illustrated in FIG. 7 is basically the same imaging device as the image sensor 10 of FIG. 1 and the configuration thereof is formed on a semiconductor substrate 111. In other words, the image sensor 100 may be any image sensor, or may be the CMOS image sensor or the CCD image sensor similar to the image sensor 10.

As illustrated in FIG. 7, the image sensor 100 has a timing control circuit 112, a line scanning circuit 113, a pixel array section 114, a DAC 115, a comparator 116, a data transfer circuit 117, and a data processing section 118.

The timing control circuit 112 controls an operation timing of each section of the image sensor 100 such as the line scanning circuit 113, the DAC 115, and the data transfer circuit 117.

The line scanning circuit 113 controls the read of the pixel signal from the pixel array section 114. The DAC 115 generates a reference signal of a ramp waveform and supplies the ramp waveform to each comparator 116. The comparator 116 is provided for each pixel column of the pixel array section 114 and compares the signal level of the pixel signal read from the pixel array section 114 with the reference signal supplied from the DAC 115 and a comparison result thereof is supplied to the data transfer circuit 117.

When the data transfer circuit 117 obtains the digital value of the pixel signal by counting the output of the comparator 116, the digital value is sequentially transferred to a data processing section 118. The data processing section 118 performs a predetermined processing such as image processing or encoding with respect to the image data, that is, the pixel signal (digital value) of all pixels of the pixel array section 114, which is obtained as described above.

As illustrated in FIG. 7, the pixel array section 114 is configured of a plurality of pixel sections 120 which are disposed in an array form. The pixel signal read from each pixel section 120 is transferred to the comparator 116 via a vertical signal line 121 connecting the pixel columns. In addition, each pixel section 120 is connected to a column selection line 122 connecting the pixel lines and an operation is controlled by the line scanning circuit 113 via the column selection line 122.

Pixel Configuration

Figure 8:
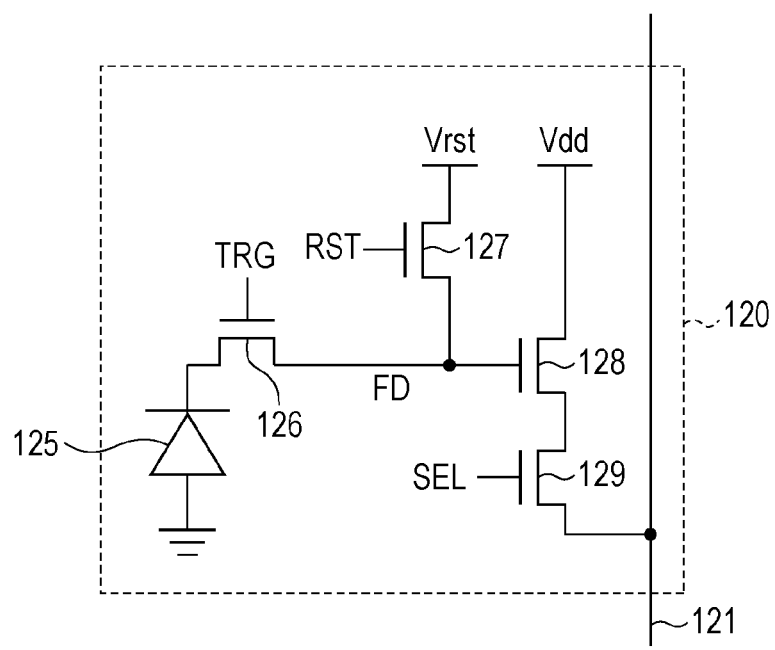
FIG. 8 is a view illustrating a main configuration example of a unit pixel.

FIG. 8 is a circuit diagram illustrating an example of a circuit configuration of the pixel section 120. As illustrated in FIG. 8, the pixel section 120 has four transistors of, for example, a read transistor 126, a reset transistor 127, an amplifier transistor 128 and a select transistor 129 in addition to such as a photodiode 125 that is a photoelectric conversion section (light receiving section).

Here, for four transistors (the read transistor 126 to the select transistor 129), for example, Metal Oxide Semiconductor (MOS) transistor of N-channel is used. However, a conductive combination of the read transistor 126, the reset transistor 127, the amplifier transistor 128 and the select transistor 129 which are exemplified above is only an example, and the present technology is not limited to the combination.

For example, as the column selection line 122, three drive wirings of a transfer line, a reset line, and a selection line are commonly provided in each pixel of the same pixel line for the pixel section 120. The transfer line, the reset line and the selection line are connected in a pixel line unit to an output end to which each end corresponds with each pixel line of a line scanning circuit 103, and transfer a transfer pulse ϕTRF, a reset pulse ϕRST and a selection pulse ϕSEL which are drive signals driving the pixel section 120.

In the photodiode 125, an anode electrode thereof is connected to a negative power supply (for example, ground) and received light is photoelectrically converted into photocharge (here, referred to as photoelectrons) of a charge amount depending on the light quantity of the received light and then the photocharge is accumulated. A cathode electrode of the photodiode 125 is electrically connected to a gate electrode of the amplifier transistor 128 via the read transistor 126. A node electrically connected to the gate electrode of the amplifier transistor 128 is referred to as FD (floating diffusion).

The read transistor 126 is connected between the cathode electrode of the photodiode 125 and the gate electrode (in other words, FD) of the amplifier transistor 128. The transfer pulse ϕTRF of which a high level (for example, Vdd level) is active (hereinafter, referred to as "High active") is given to the gate electrode of the read transistor 126 via the transfer line. Therefore, the read transistor 126 is turned on and the photocharge which is photoelectrically converted in the photodiode 125 is transferred to the floating diffusion (FD).

In the reset transistor 127, a drain electrode is connected to the pixel power supply Vdd and a source electrode is connected to the floating diffusion (FD), respectively. The reset pulse ϕRST of High active is given to the gate electrode of the reset transistor 127 via the reset line. Therefore, the reset transistor 127 is turned on and the floating diffusion (FD) is reset by discarding the electric charge of floating diffusion (FD) to the pixel power supply Vdd.

In the amplifier transistor 128, the gate electrode is connected to the floating diffusion (FD) and the drain electrode is connected to the pixel power supply Vdd, respectively. Then, the amplifier transistor 128 outputs a potential of floating diffusion (FD) as a reset signal (reset level) after the floating diffusion (FD) is reset by the reset transistor 127. Furthermore, the amplifier transistor 128 outputs the potential of the floating diffusion (FD) as a light accumulation signal (signal level) after the signal electric charge is transferred by the read transistor 126.

In the select transistor 129, for example, drain electrode is connected to the source electrode of the amplifier transistor 128 and the source electrode is connected to the vertical signal line 121, respectively. The selection pulse ϕSEL of High active is given to the gate electrode of the select transistor 129 via the selection line. Therefore, the select transistor 129 is turned on and the signal output from the amplifier transistor 128 is relayed to the vertical signal line 121 as a selection state of the pixel section 120.

In addition, the select transistor 129 may employ a circuit configuration which is connected between the pixel power supply Vdd and the drain of the amplifier transistor 128.

Furthermore, the pixel section 120 is not limited to the pixel configuration configured of four transistors having above described configuration. For example, a pixel configuration which is configured of three transistors also served as the amplifier transistor 128 and the select transistor 129 may be used and the configuration of the pixel circuit thereof does not matter.

Data Transfer Circuit

Figure 9:
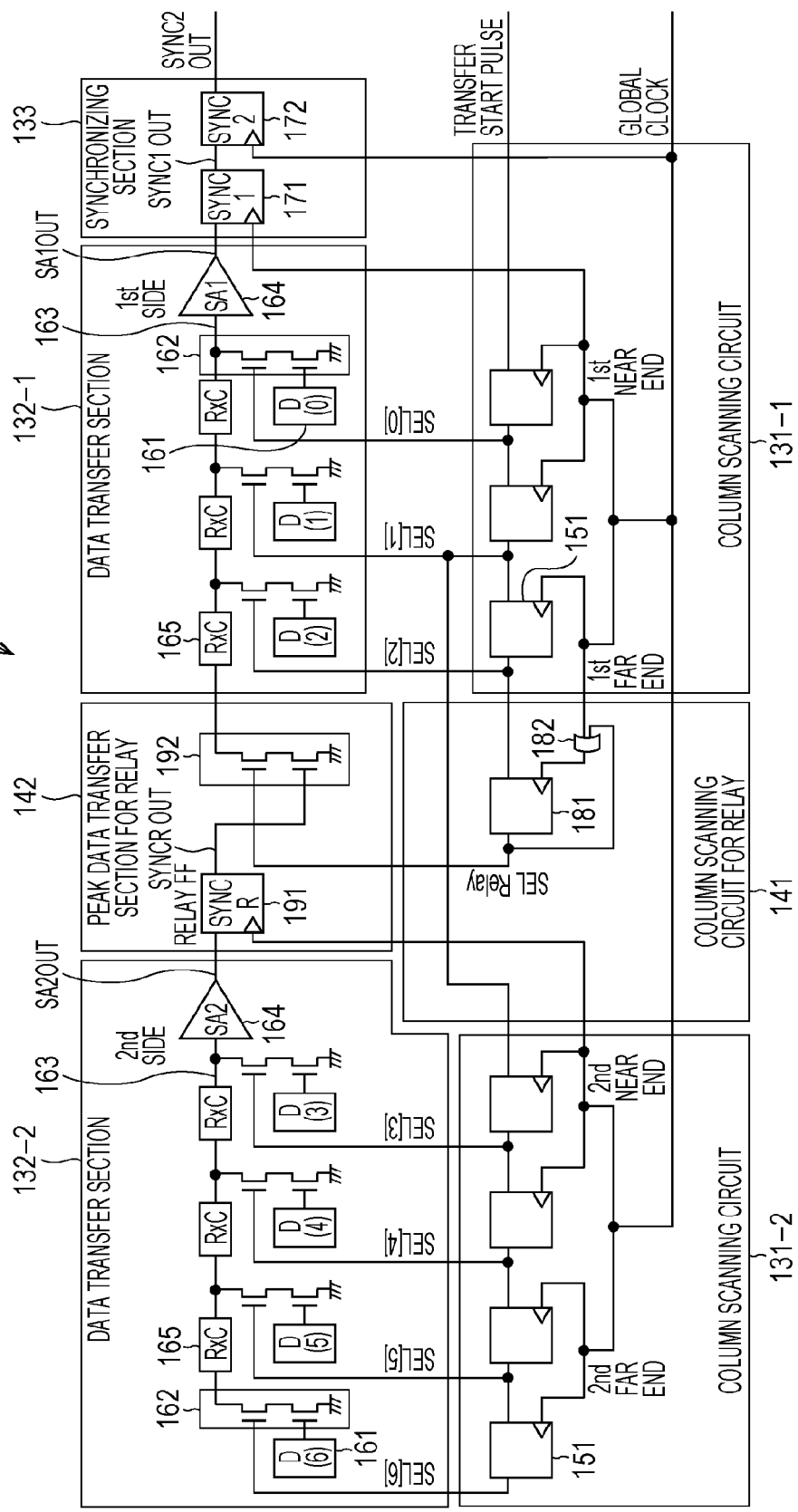
FIG. 9 is a view illustrating a main configuration example of a data transfer circuit.

A main configuration example of the data transfer circuit 117 of FIG. 7 is illustrated in FIG. 9. The present technology is applied to the data transfer circuit 117 illustrated in FIG. 9. In other words, in the data transfer circuit 117, the data transfer path is divided into two.

In the present technology, in order to reduce the wiring delay on the transfer bus line which transfers the data to the digital data output section in the image sensor on which the column-parallel A/D is mounted, the transfer bus is divided and the amplifier circuit (sense amplifier), which amplifies the signal output from the transfer bus, is multi-staged (n-divide). The wiring delay generated on the transfer bus line is determined by product of resistance and capacitance of the wiring. The wiring delay increases in proportion to the square of a wiring length in the transfer bus line of which a wiring width is uniform. Then, the present technology is adapted to reduce $(1/n^2)$ the delay on the transfer line by dividing the transfer bus line into several parts (n-divide).

In other words, the delay $(1/n^2)$ on the transfer line is reduced and data capture in a processing section of a subsequent stage can be performed with a high speed and high accuracy by applying the present technology. In addition, it is possible to cancel internal latency generated by the relay by devising an access method of a scan circuit.

Such present technology is applied to the data transfer circuit 117. As illustrated in FIG. 9, the data transfer circuit 117 has a column scanning circuit 131-1, a column scanning circuit 131-2, a data transfer section 132-1, a data transfer section 132-2, a synchronizing section 133, a relay column scanning circuit 141 and a relay data transfer section 142.

The column scanning circuit 131-1 has a plurality of shift registers 151 and controls data transfer in the data transfer section 132-1. The column scanning circuit 131-2 has a plurality of shift registers 151 and controls the data transfer in the data transfer section 132-2. The column scanning circuit 131-1 and the column scanning circuit 131-2 are simply referred to as the column scanning circuit 131 if a description is not necessary for distinguishing from each other.

The data transfer section 132-1 corresponds to the pixel column of a portion of the pixel array section 114 and transfers the pixel signal read from the corresponding pixel column to the synchronizing section 133. The data transfer section 132-1 has a counter latch 161 which counts and holds the pixel signal of the pixels of the pixel column, and a drive transistor 162 which controls the read of the pixel signal from the counter latch 161 with respect to the corresponding pixel columns.

A pair of transfer bus pairs 163 connecting units of each pixel column configured of the counter latch 161 and the drive transistor 162 is connected to a sense amplifier 164. In other words, a digital value of the pixel signal read from the counter latch 161 of each pixel column is supplied to the transfer bus pair 163 via the drive transistor 162 and supplied to the sense amplifier 164 via the transfer bus pair 163. In addition, the pixel signal of the pixels of the pixel column corresponding to a data transfer section 162-2, which is supplied from the data transfer section 162-2 via the relay data transfer section 142, is also supplied to the transfer bus pair 163. The transfer bus pair 163 supplies the pixel signal of the pixels corresponding to the data transfer section 132-2 to the sense amplifier 164 following the pixel signal of the pixels corresponding to the data transfer section 132-1.

The sense amplifier 164 amplifies the pixel signal of the pixels of each pixel column, which is sequentially supplied via the transfer bus pair 163 and supplies the pixel signal to the synchronizing section 133. In addition, as described above, the transfer bus pair 163 includes a wiring delay 165 presented by product of the resistance and the capacitance, and the delay amount of the wiring delay 165 is increased as the distance is increased.

The data transfer section 132-2 also has the configuration similar to the data transfer section 132-1 and is configured of the counter latch 161, the drive transistor 162, the transfer bus pair 163 and the sense amplifier 164 for each pixel column. In addition, the transfer bus pair 163 includes the wiring delay 165.

In addition, the sense amplifier 164 of the data transfer section 132-2 amplifies the pixel signal of the pixels of each pixel column, which is sequentially supplied via the transfer bus pair 163, and supplies the pixel signal to the relay data transfer section 142.

The data transfer section 132-1 and the data transfer section 132-2 are simply referred to as the data transfer section 132 if a description is not necessary for distinguishing from each other.

The relay column scanning circuit 141 is configured of a shift register 181 and an OR circuit 182, and the data transfer is controlled in the relay data transfer section 142.

The relay data transfer section 142 acquires the pixel signal output from the data transfer section 132-2, temporarily holds the pixel signal and supplies the pixel signal which is held to the data transfer section 132-1. The relay data transfer section 142 has a relay shift register 191 and a relay drive transistor 192.

The relay shift register 191 temporarily holds the output (the pixel signal) of the sense amplifier 164 of the data transfer section 132-2. The relay drive transistor 192 controls the read of the pixel signal from the relay shift register 191. The pixel signal read depending on the control of the relay drive transistor 192 is supplied to the transfer bus pair 163 of the data transfer section 132-1.

In other words, the transfer bus pair 163 of the data transfer circuit which transfers the pixel signal read from each pixel column of the pixel array section 114 is divided into several parts. The data transfer section 132-1 and the data transfer section 132-2 are connected to each other in series.

As described above, it is possible to reduce the wiring delay 165 of the transfer bus pair 163 by configuring the data transfer section 132 in the multi-stage and by decreasing the length of the transfer bus pair 163.

In addition, it is possible to easily synchronize the timing of the output of each data transfer section 132 by connecting between each data transfer section 132 via the relay data transfer section 142. Furthermore, it is possible to accelerate the read timing of the pixel signal of the pixels of each pixel column in the data transfer section 132-2 by temporarily holding the output of the data transfer section 132 by the relay shift register 191.

Figure 10:
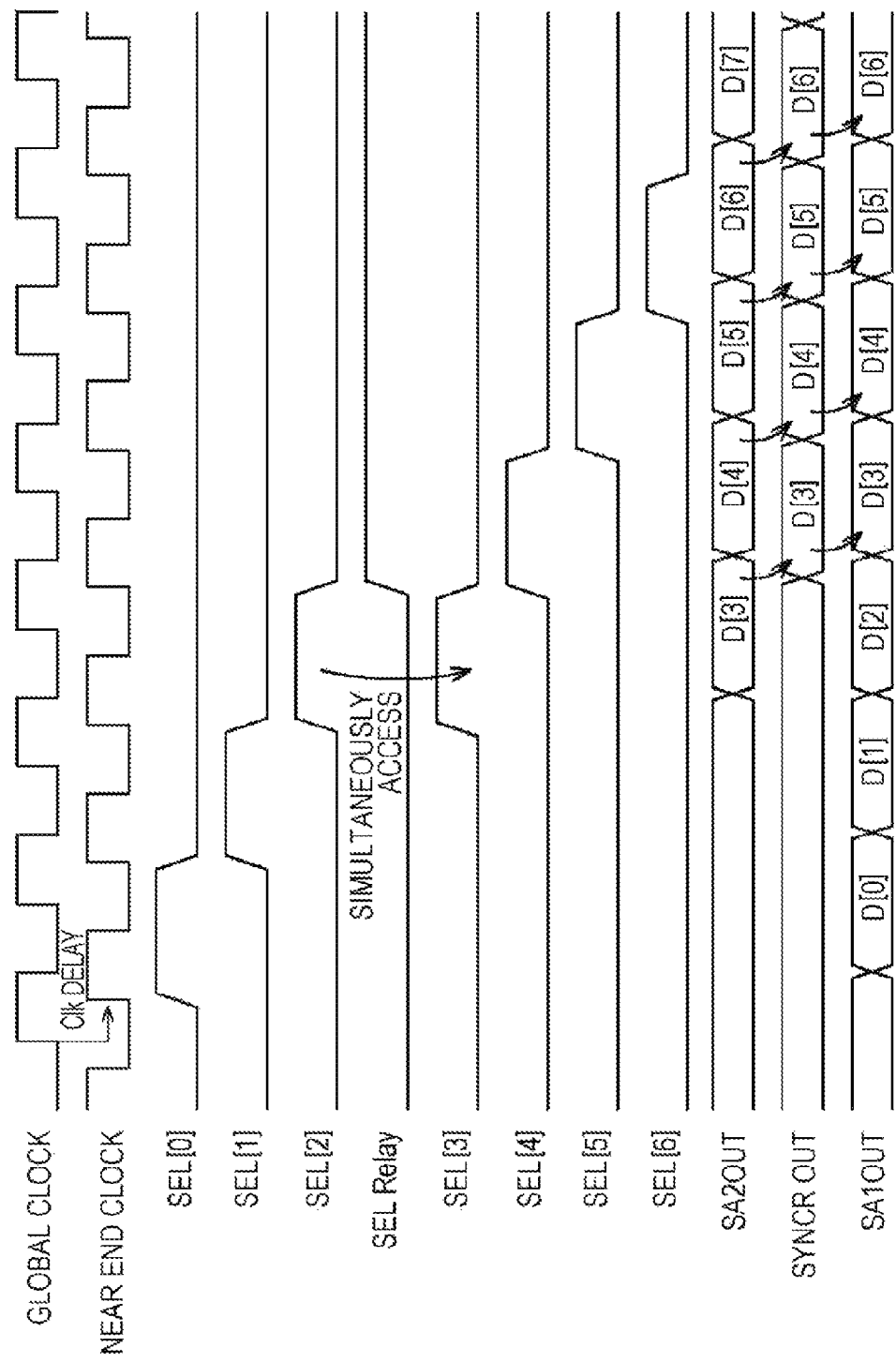
FIG. 10 is a view representing an example of a relationship between setup hold margins of a data transfer circuit.

FIG. 10 illustrates detailed drive in the configuration of the data transfer circuit using the present technology. Similar to the configuration of the related art, sequential access is performed on the counter latch of the far end from the near end by the column scanning circuit 131. The transfer of the data of the counter latch 161 connected to SA1st is finished and, at the same time, a select signal SEL Relay of the relay drive transistor 192 is fixed in Hi and the counter latch data following SA2nd is sequentially transferred. Since the output of SA2nd has the output delay with respect to the delay clock which is input into the column scanning circuit 131, the synchronization is performed with the delay clock before the relay is performed.

Since the relay data transfer section 142 performs the synchronization at one stage by the relay shift register 191, the output delay of one cycle occurs in the output of the sense amplifier which is relayed. Thus, the internal latency of one cycle of a horizontal transfer clock, which occurs in the relay shift register 191, is cancelled by performing early access of one cycle in the column scanning circuit 131-2 on SA2nd side.

Figure 11:
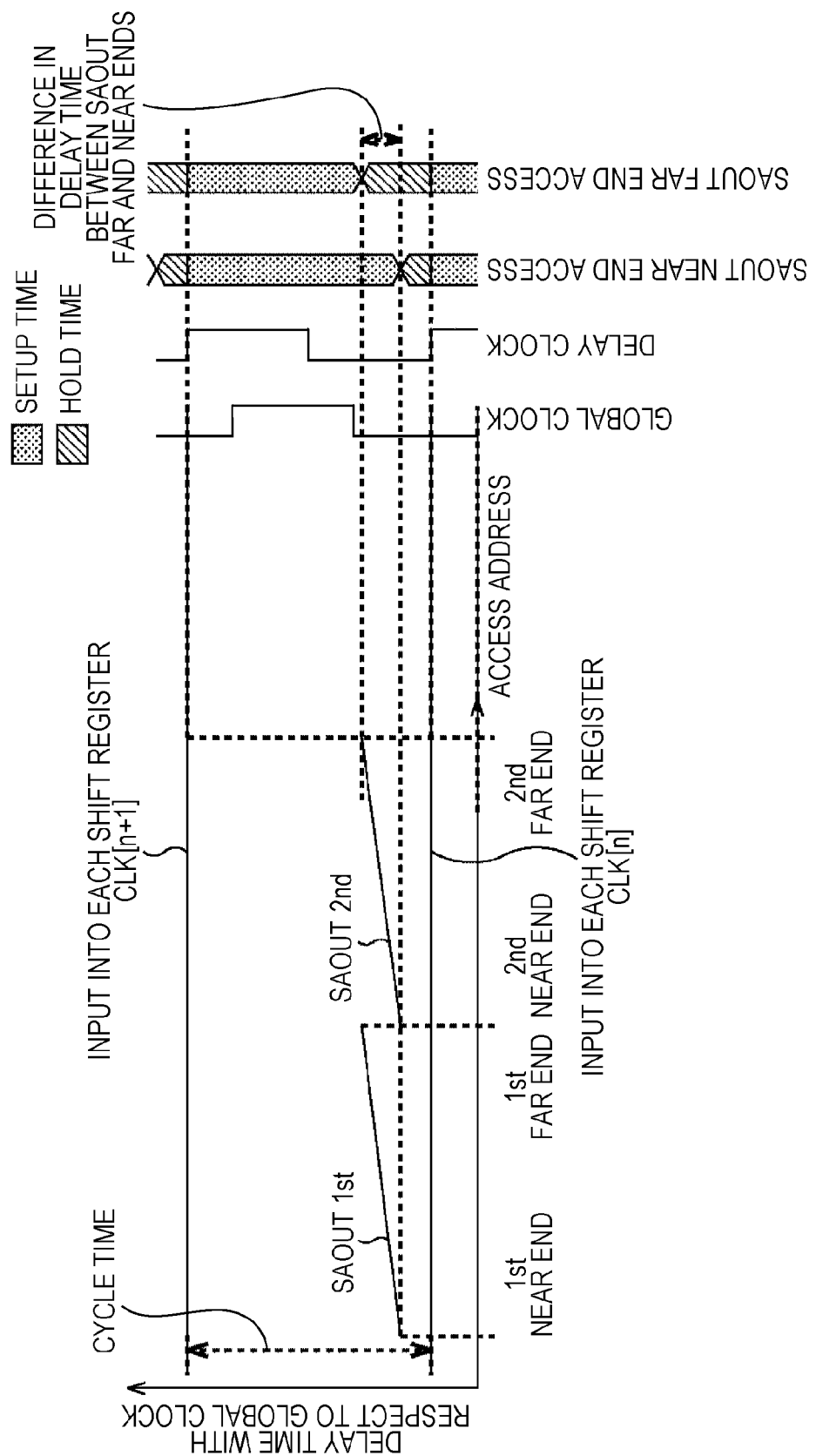
FIG. 11 is a view representing an example of an output delay amount of a data transfer circuit.

FIG. 11 is a view representing an output of the sense amplifier with respect to global clock and an output delay amount of the clock which is distributed in the branches and leaves form in the configuration of the data transfer circuit using the present technology. In the data transfer circuit 117 using the present technology, it is possible to reduce the wiring delay 165 which is generated on the transfer bus pair 163 by dividing the transfer bus pair 163 of the sense amplifier 164 into two. Difference in delay time between the far and near ends of the sense amplifier is reduced, and setup time margin and a hold time margin of the flip-flop measuring the synchronization with the global clock is increased by reducing the wiring delay 165. Even in a case where the number of handling column-parallel A/D is in large numbers or in a case where the transfer line is long, it is possible to reduce the wiring delay generated on the transfer line by applying the present technology.

Multi-Stage Configuration

Figure 12:
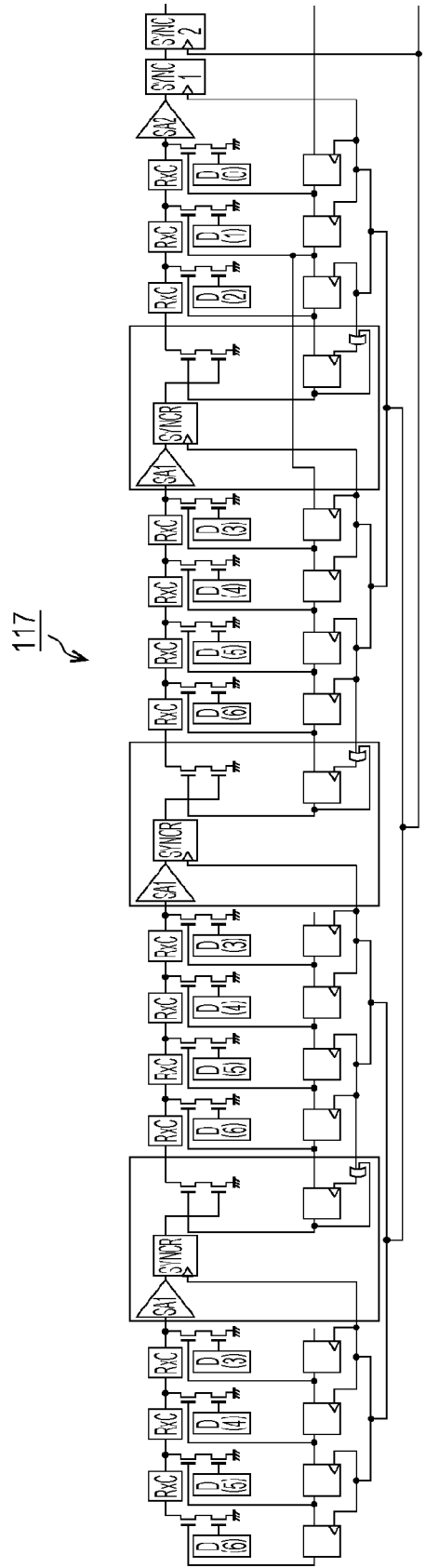
FIG. 12 is a view illustrating another configuration example of the data transfer circuit.

In the above configuration, the example in which the transfer bus pair 163 is divided into two is described; however, the division number is arbitrary. For example, as illustrated in FIG. 12, it may be divided into four and may be divided into sixteen or more. As described above, it is possible to further reduce the delay on the transfer line by increasing the number of division.

Relay Data Transfer Section

Figure 13:
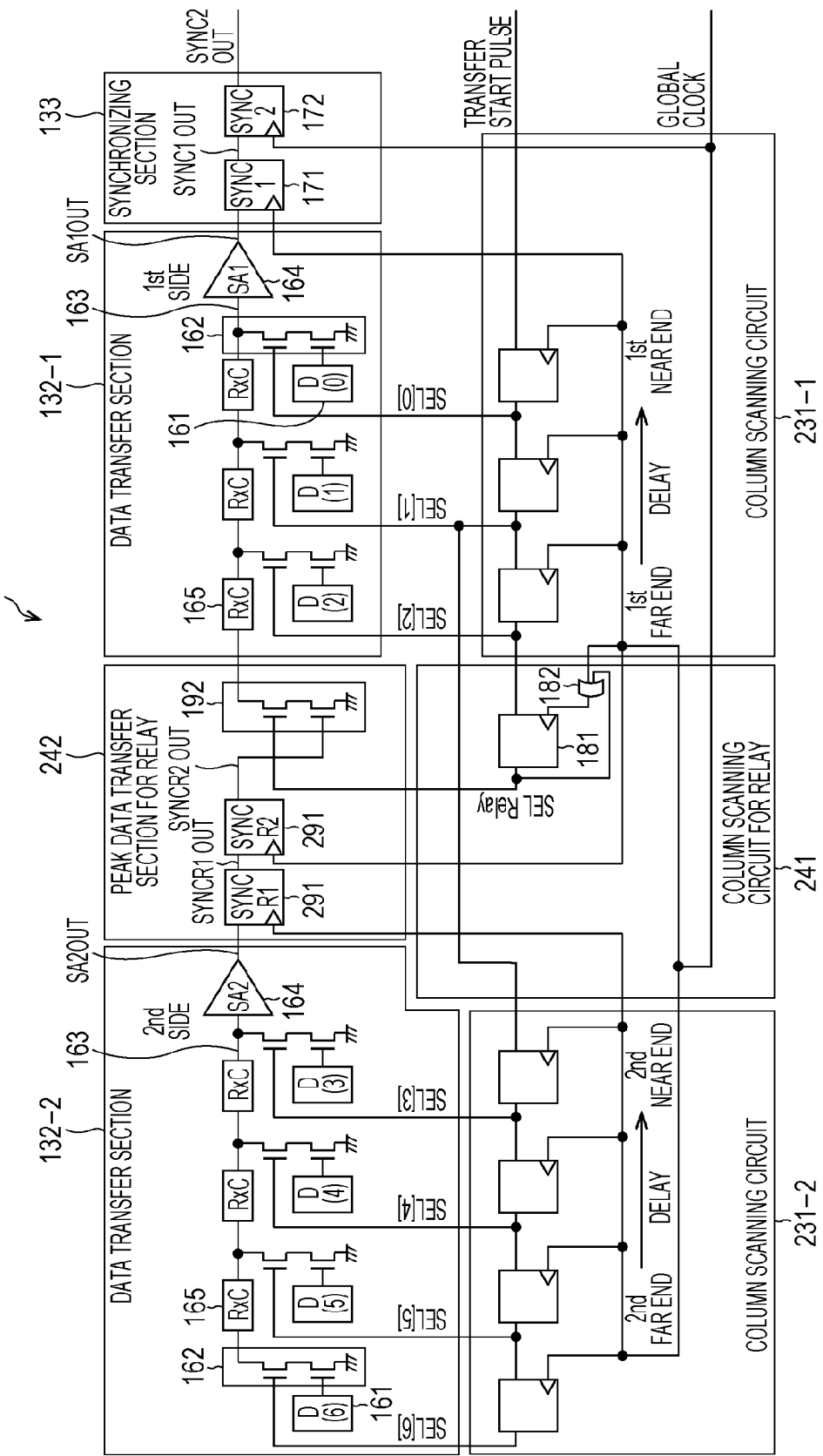
FIG. 13 is a view illustrating still another configuration example of the data transfer circuit.

In addition, in the relay data transfer section, as illustrated in an example in FIG. 13, the shift register may be configured of two or more stages.

The data transfer circuit 117 of the case of the example in FIG. 13 has a relay column scanning circuit 241 instead of the relay column scanning circuit 141 and a relay data transfer section 242 instead of the relay data transfer section 142. Furthermore, the data transfer circuit 117 has a column scanning circuit 231-1 instead of the column scanning circuit 131-1 and a column scanning circuit 231-2 instead of the column scanning circuit 131-2.

The relay data transfer section 242 has a relay shift register 291 instead of the relay shift register 191 and a relay shift register 292. In other words, unlike the relay data transfer section 142, the pixel signal which is supplied is held in maximum two cycles. The relay shift register 291 is operated synchronized with the data transfer section 132-2. The relay shift register 292 is operated by being synchronized with the data transfer section 132-1.

In the data transfer circuit 117, a clock line configuration which is input into each shift register is different from the case of FIG. 9. Access timing of the column scanning circuit 231 with respect to global clock is different between far and near ends and it is a circuit configuration for cancelling output delay in the far and near ends of the sense amplifier 164. Since the sense amplifier 164 which is divided into two is independent in timing basis in each system, the flip-flop for resynchronization is inserted in two stages.

Figure 14:
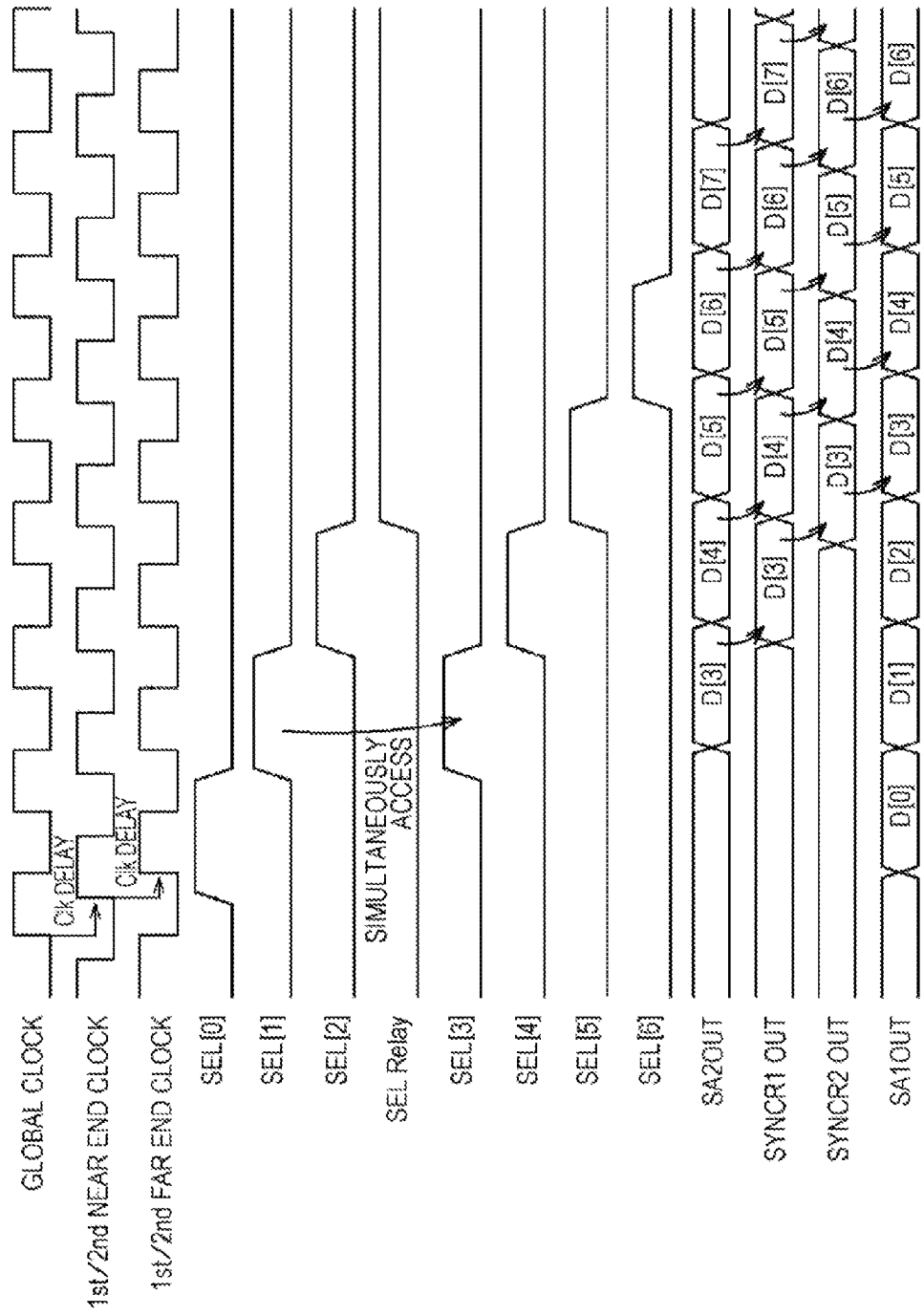
FIG. 14 is a view representing another example of a relationship between setup hold margins of the data transfer circuit.

FIG. 14 illustrates detailed drive of this case. Similar to the case of FIG. 10, in the data transfer circuit 117, sequential access is performed to the counter latch of the far end from the near end by the column scanning circuit 131. The transfer of the counter latch data connected to SA1st is finished and, at the same time, the select signal SEL Relay of the relay drive transistor is fixed in Hi and the counter latch data following SA2nd is sequentially transferred.

Since the output of SA2nd has the output delay with respect to the delay clock which is input into the column scanning circuit, the synchronization is performed with the delay clock in the 2nd near end before the relay is performed. Since the sense amplifier which is divided into two is independent in timing basis in each system by changing the clock line configuration, further synchronization is performed in the 1st far end delay clock. Since the output of the sense amplifier which is relayed passes through two flip-flops, output delay of two cycles occurs. Thus, the internal latency of two cycles of the horizontal transfer clock, which occurs in the relay FF, is cancelled by performing early access of two cycles in the column scanning circuit on SA2nd side.

Figure 15:
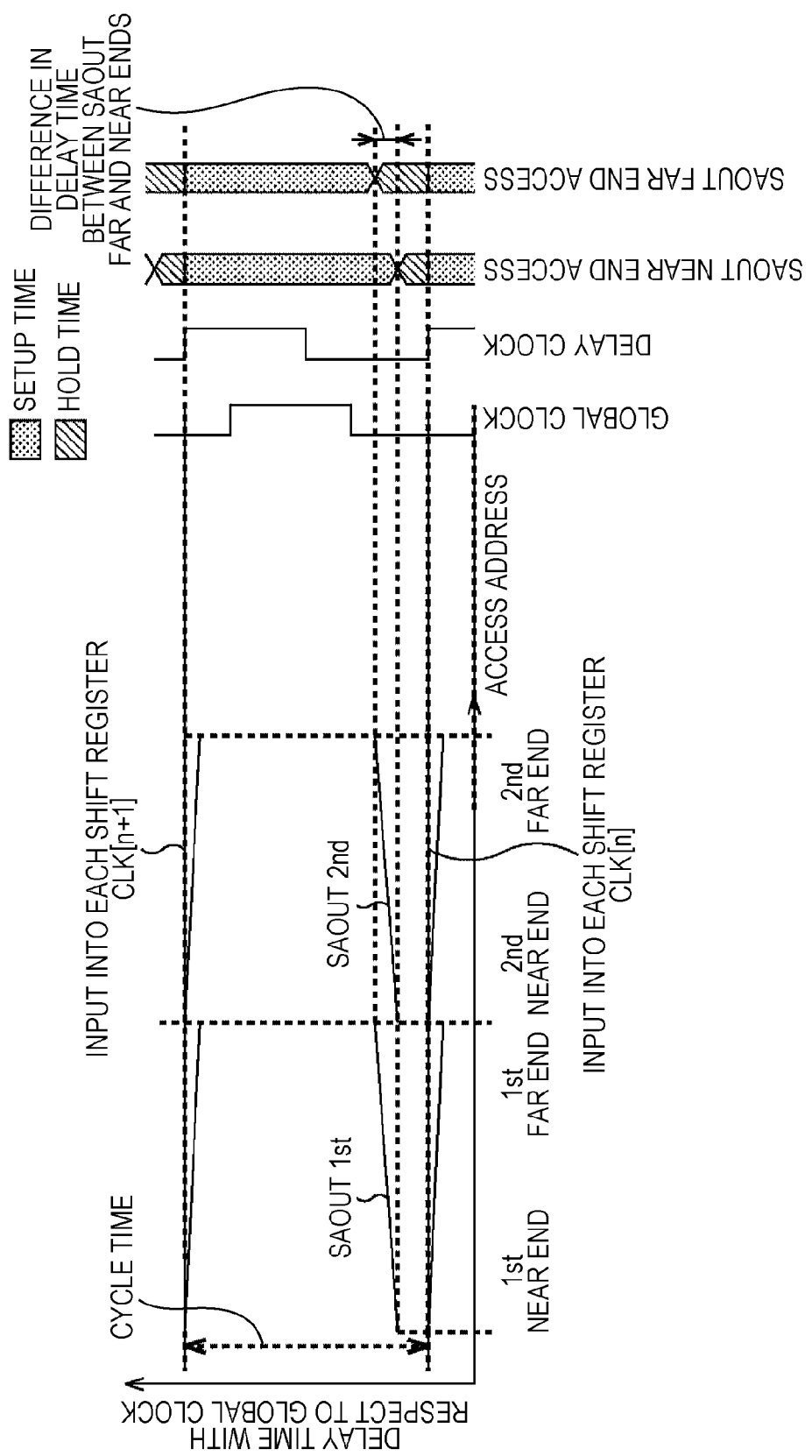
FIG. 15 is a view representing another example of the output delay amount of the data transfer circuit.

FIG. 15 represents the output of the sense amplifier with respect to the global clock and output delay amount of the clock which is distributed in the branches and leaves form in the data transfer circuit in which the present technology is used. Since the delay amount of the input clock into each shift register is reduced toward the far end side, the data transfer circuit is configured for cancelling the output delay amount in the far and near ends of the sense amplifier. Thus, the output delay amount of the sense amplifier with respect to the global clock is decreased compared to the case of FIG. 11.

As described above, the delay of the data transfer circuit is reduced and data capture in the digital data output section can be performed with high accuracy at high speed by using the present technology.

2. Second Embodiment

Imaging Apparatus

Figure 16:
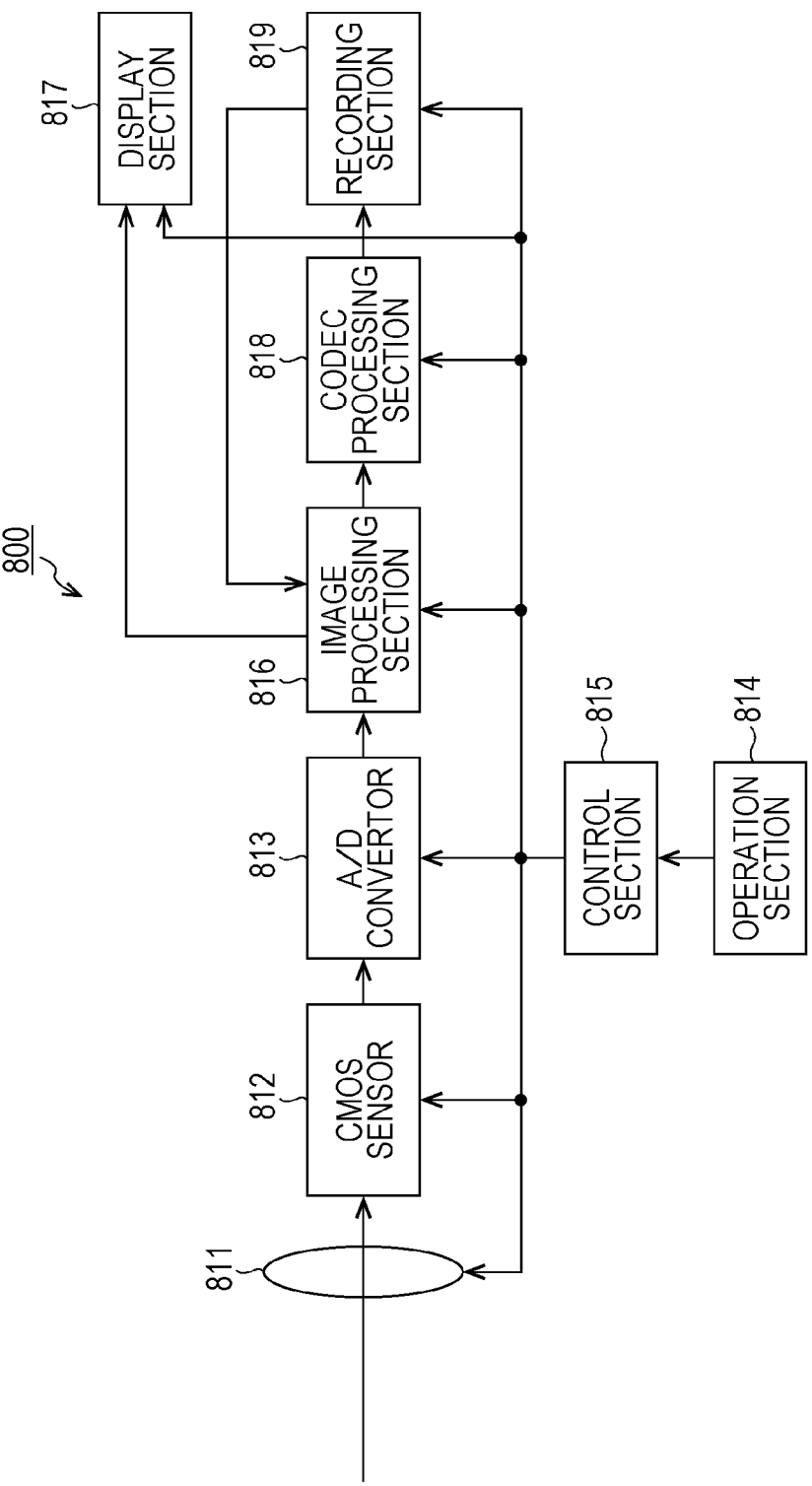
FIG. 16 is a block diagram illustrating a main configuration example of an imaging apparatus.

FIG. 16 is a block diagram illustrating a main configuration example of the imaging apparatus. An imaging apparatus 800 illustrated in FIG. 16 is an apparatus which images an object and outputs the target image as an electric signal.

As illustrated in FIG. 16, the imaging apparatus 800 has an optical section 811, a CMOS sensor 812, an A/D convertor 813, an operation section 814, a control section 815, an image processing section 816, a display section 817, a codec processing section 818 and a recording section 819.

The optical section 811 is configured of a lens which adjusts a focus to the object and collects light from a focused position, an aperture which adjusts light exposure, a shutter which controls timing of the image and the like. The optical section 811 penetrates the light from the object (incident light) and supplies the light to the CMOS sensor 812.

The CMOS sensor 812 photoelectrically converts the incident light and supplies the signal (pixel signal) for each pixel to the A/D convertor 613.

The A/D convertor 813 converts the pixel signal supplied with a predetermined timing from the CMOS sensor 812 into the digital data (image data) and sequentially supplies the data to the image processing section 816 at a predetermined timing.

The operation section 814 is, for example, configured of Jog Dial™, keys, buttons, a touch panel or the like and receives an operation input by a user, and supplies the signal corresponding to the operation input to the control section 815.

The control section 815 controls drive of the optical section 811, the CMOS sensor 812, the A/D convertor 813, the image processing section 816, the display section 817, the codec processing section 818 and the recording section 819 based on the signal corresponding to the operation input of the user which is input by the operation section 814, and allows each section to perform processing regarding the imaging.

The image processing section 816 performs, for example, various image processing such as mixed color correction, black level correction, white balance adjustment, demosaic processing, matrix processing, gamma correction and YC conversion with respect to the image data supplied from the A/D convertor 813. The image processing section 816 supplies the image data on which the image processing is performed to the display section 817 and the codec processing section 818.

The display section 817 is configured of, for example, a liquid crystal display or the like and displays the target, based on the image data supplied from the image processing section 816.

The codec processing section 818 performs an encoding process in a predetermined manner with respect to the image data supplied from the image processing section 816 and supplies the obtained encoded data to the recording section 819.

The recording section 819 records the encoded data from the codec processing section 818. The encoded data recorded in the recording section 819 is decoded by reading the data in the image processing section 816 if necessary. The image data obtained by decoding processing is supplied to the display section 817 and the corresponding image is displayed.

As described above, the present technology is applied to the CMOS sensor 812 and the A/D convertor 813 of the imaging apparatus 800. In other words, the image sensor 100 described above is applied as the CMOS sensor 812 and the A/D convertor 813. Accordingly, the CMOS sensor 812 and the A/D convertor 813 can suppress the increase in the transfer delay of the data transfer circuit and can realize the high accuracy of the data capture at a high speed in the image processing section 816. Therefore, the imaging apparatus 800 can obtain an image having higher image quality by imaging the object.

In addition, the imaging apparatus to which the present technology is applied is not limited to the configuration described above and may be formed by other configurations. For example, it may be an information processing apparatus having an imaging function such as a mobile phone, a smart phone, a tablet type device and a personal computer in addition to a digital still camera or a video camera. In addition, it may be a camera module which is used (or is loaded as a built-in device) by mounting on another information processing apparatus.

Furthermore, in the specification, the system means an assembly of a plurality of configuration elements (apparatus, module (part) or the like) and it does not matter whether or not all configuration elements are in the same casing. Accordingly, the system includes a plurality of apparatuses which are stored in separate casings and are connected to each other via a network, and one apparatus in which a plurality of modules are stored in one casing.

In addition, in the above description, the configuration which is described as one apparatus (or a processing section) may be divided and the configuration may be formed of a plurality of apparatuses (or processing sections). Conversely, in the above description, the configuration may be formed of one apparatus (or processing section) by collecting the configuration which is described as a plurality of apparatuses (or processing sections). In addition, of course, other configurations besides the configuration described above may be added to the configuration of each apparatus (or each processing section). Furthermore, when the configuration and operation as the entire system are substantially the same, a portion of the configuration of an apparatus (or processing section) may be included in the configuration of another apparatus (or another processing section).

The above is specifically described on a preferred embodiment of the present technology with reference to the accompanying drawings; however, the technical scope of the present technology is not limited thereto. It is clear that a person having common knowledge in the art of the present technology may conceive various modified examples or revised examples in the scope of technical idea described in the claims. In these regards, it is understood that these examples belong to the technical range of the present technology.

For example, the present technology can employ a configuration of cloud computing which handles jointly one function by sharing the function in a plurality of apparatuses via a network.

In addition, each step described in the flowchart described above can be performed by sharing the step among a plurality of apparatuses in addition to being performed by one apparatus.

Furthermore, when a plurality of processing are included in one step, the plurality of processing included in one step can be performed by sharing the processing in a plurality of apparatuses in addition to being performed by one apparatus.

In FIG. 1, the configuration described above is described as being formed on one sheet of the semiconductor substrate 101; however, the configuration may be formed on a plurality of semiconductor substrates. For example, the pixel array section 102, the line scanning section 103, the column processing section 104, the column scanning section 105 and the system control section 106 may be formed on substrates different from each other and then the CMOS image sensor 100 may be formed as the imaging device of a laminated type in which two substrates are laminated.

In addition, the present technology can take the following configuration.

(1) A data transfer circuit including: a plurality of data transfer sections which transfer pixel signals of pixel columns which are different from each other, wherein the plurality of data transfer sections includes transfer lines which transfer the pixel signals read from the pixel columns of an image sensor; and amplifying sections which amplify the pixel signals output from the transfer lines, and wherein the plurality of data transfer sections are connected to each other in series.

(2) The data transfer circuit according to any one of (1) to (9), wherein the data transfer section includes, for each pixel column a counter latch which holds the pixel signal by converting a signal level of the pixel signal read from the pixel into a digital value, and wherein the transfer line sequentially transfers the digital value which is held in each counter latch.

(3) The data transfer circuit according to any one of (1) to (9), further including: a column scanning circuit which controls a transfer timing of the pixel signal of each pixel column for each data transfer section, wherein each column scanning circuit has clock lines which are independent from each other to obtain clock signals.

(4) The data transfer circuit according to any one of (1) to (9), further including: a relay data transfer section which holds the pixel signal output from the data transfer section and supplies the pixel signal which is held to the data transfer section of the next stage, wherein the plurality of data transfer sections are connected to each other in series via the relay data transfer section.

(5) The data transfer circuit according to any one of (1) to (9), wherein the relay data transfer section includes a holding section which holds the pixel signal; and a reading section which reads the pixel signal held in the holding section.

(6) The data transfer circuit according to any one of (1) to (9), wherein the reading section reads the pixel signal held in the holding section when being synchronized between the plurality of data transfer sections.

(7) The data transfer circuit according to any one of (1) to (9), wherein the data transfer section supplying the pixel signal to the relay data transfer section supplies the pixel signal of each pixel column to the relay data transfer section earlier than a timing of the pixel signal corresponding to the output timing from the data transfer circuit.

(8) The data transfer circuit according to any one of (1) to (9), wherein the relay data transfer section includes a plurality of holding sections, wherein the data transfer section supplying the pixel signal to the relay data transfer section supplies the pixel signal of each pixel column to the relay data transfer section earlier than a timing of the pixel signal corresponding to the output timing from the data transfer circuit by an amount of time corresponding to the number of the holding sections of the relay data transfer section.

(9) The data transfer circuit according to any one of (1) to (8), further including: a synchronizing section which synchronizes with an output timing of the pixel signal output from the data transfer section closest to output side.

(10) An imaging device including: a pixel area which has a plurality of pixels having a light receiving section which photoelectrically converts incident light; and a plurality of data transfer sections which transfer pixel signals of the pixel columns which are different from each other, wherein the plurality of data transfer sections include transfer lines which transfer the pixel signals read from pixel columns of the pixel area; and amplifying sections which amplify the pixel signals output from the transfer lines, and wherein the plurality of data transfer sections are connected to each other in series.

(11) An imaging apparatus including: an imaging device; and an image processing section which processes a target image which is photoelectrically converted in the imaging device, wherein the imaging device includes a pixel area which has a plurality of pixels having a light receiving section which photoelectrically converts incident light; and a plurality of data transfer sections which transfer pixel signals of the pixel columns which are different from each other, wherein the plurality of data transfer sections include transfer lines which transfer the pixel signals read from pixel columns of the pixel area; and amplifying sections which amplify the pixel signals output from the transfer lines, and wherein the plurality of data transfer sections are connected to each other in series.

What is claimed is:

1. A data transfer circuit, comprising:
a first circuit and a second circuit configured to transfer pixel signals of pixel columns which are different from each other; and
a relay data transfer circuit configured to hold a pixel signal output from the first circuit and supply the held pixel signal to the second circuit, wherein the first circuit and the second circuit are connected to each other in series,
wherein the relay data transfer circuit includes a plurality of holding circuits, and
wherein the first circuit that supplies the pixel signal to the relay data transfer circuit is configured to supply the pixel signal of each of the pixel columns to the relay data transfer circuit earlier than a timing of the pixel signal that corresponds to an output timing from the second circuit by an amount of time that corresponds to a number of holding circuits among the plurality of holding circuits of the relay data transfer circuit.

2. The data transfer circuit according to claim 1,
wherein each of the first circuit and the second circuit includes, for each of the pixel columns, a counter latch configured to convert a signal level of a corresponding pixel signal read from a pixel of an image sensor into a digital value to hold the corresponding pixel signal, and wherein transfer lines that transfer the pixel signals read from the image sensor sequentially transfer the digital value held in a corresponding counter latch.

3. The data transfer circuit according to claim 2, further comprising:
a column scanning circuit configured to control a transfer timing of the corresponding pixel signal of each pixel column for each of the first circuit and the second circuit,
wherein the column scanning circuit has clock lines which are independent from each other to obtain clock signals.

4. The data transfer circuit according to claim 1, wherein the first circuit and the second circuit are connected to each other in series via the relay data transfer circuit.

5. The data transfer circuit according to claim 1, wherein one of the holding circuits of the plurality of holding circuits is configured to hold the pixel signal output from the first circuit; and
wherein the relay data transfer circuit comprises a reading circuit configured to read the pixel signal held in the one of the holding circuit of the plurality of holding circuits.

6. The data transfer circuit according to claim 5, wherein the reading circuit is configured to read the pixel signal held in the one of the holding circuits of the plurality of holding circuits in an event of the holding circuit is synchronized with the first circuit and the second circuit.

7. The data transfer circuit according to claim 1, further comprising: a synchronizing circuit configured to synchronize with an output timing of a pixel signal output from a third circuit closest to an output side.

8. An imaging device, comprising:
a pixel area which has a plurality of pixels that have a light receiving circuit configured to photoelectrically convert incident light; and
a first circuit and a second circuit configured to transfer pixel signals of pixel columns which are different from each other, wherein the first circuit and the second circuit include:
transfer lines configured to transfer the pixel signals read from the pixel columns of the pixel area; and
amplifying circuits configured to amplify the pixel signals output from the transfer lines; and
a relay data transfer circuit configured to hold a first pixel signal output from the first circuit and supply the held first pixel signal to the second circuit, wherein the first circuit and the second circuit are connected to each other in series,
wherein the first circuit that supplies the first pixel signal to the relay data transfer circuit is configured to supply the first pixel signal of each of the pixel columns to the relay data transfer circuit earlier than a timing of the a second pixel signal that corresponds to an output timing from an image processing circuit of the imaging device by an amount of time that corresponds to a number of holding circuits among a plurality of holding circuits of the relay data transfer circuit.

9. An imaging apparatus, comprising:
an imaging device; and
an image processing circuit configured to process a target image which is photoelectrically converted in the imaging device, wherein the imaging device includes:
a pixel area which has a plurality of pixels that have a light receiving circuit configured to photoelectrically convert incident light; and
a first circuit and a second circuit configured to transfer pixel signals of pixel columns which are different from each other, wherein the first circuit and the second circuit include:
transfer lines configured to transfer the pixel signals read from the pixel columns of the pixel area; and
amplifying circuits configured to amplify the pixel signals output from the transfer lines; and
a relay data transfer circuit configured to hold a first pixel signal output from the first circuit and supply the held first pixel signal to the second circuit, wherein the first circuit and the second circuit are connected to each other in series,
wherein the first circuit that supplies the first pixel signal to the relay data transfer circuit is configured to supply the first pixel signal of each of the pixel columns to the relay data transfer circuit earlier than a timing of a second pixel signal that corresponds to an output timing from the image processing circuit by an amount of time that corresponds to a number of holding circuits among a plurality of holding circuits of the relay data transfer circuit.

10. A data transfer circuit, comprising:
a first circuit and a second circuit configured to transfer pixel signals of pixel columns which are different from each other, wherein the first circuit and the second circuit include:
transfer lines configured to transfer the pixel signals read from the pixel columns of an image sensor; and
amplifying circuits configured to amplify the pixel signals output from the transfer lines; and
a relay data transfer circuit configured to hold a pixel signal output from the first circuit and supply the held pixel signal to the second circuit,
wherein the first circuit and the second circuit are connected to each other in series via the relay data transfer circuit,
wherein the relay data transfer circuit includes a plurality of holding circuits configured to hold the first pixel signal output from the first circuit, and
wherein the first circuit that supplies the pixel signal to the relay data transfer circuit is configured to supply the pixel signal of each of the pixel columns to the relay data transfer circuit earlier than a timing of the pixel signal that corresponds to an output timing from the second circuit by an amount of time that corresponds to a number of the plurality of holding circuits of the relay data transfer circuit.

* * * * *